(12) United States Patent
Lipstein et al.

(10) Patent No.: US 10,920,605 B2
(45) Date of Patent: Feb. 16, 2021

(54) SYSTEM AND METHOD FOR MEASURING ECCENTRICITY OF TURBINE SHELL RELATIVE TO TURBINE ROTOR

(71) Applicant: General Electric Company, Schenectady, NY (US)

(72) Inventors: Travis Edwin Lipstein, Greenville, SC (US); Taylor Janae Million, Greenville, SC (US); Glen William Brooksby, Glenville, NY (US); Sandra Beverly Kolvick, Simpsonville, SC (US); James Scott Flanagan, Simpsonville, SC (US); Thomas Alan Mogle, II, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 450 days.

(21) Appl. No.: 15/849,703

(22) Filed: Dec. 21, 2017

(65) Prior Publication Data

US 2019/0195084 A1   Jun. 27, 2019

(51) Int. Cl.
*F01D 21/00* (2006.01)
*G01B 11/27* (2006.01)
*G01B 11/14* (2006.01)

(52) U.S. Cl.
CPC ............ *F01D 21/003* (2013.01); *G01B 11/14* (2013.01); *G01B 11/27* (2013.01);
(Continued)

(58) Field of Classification Search
CPC ........ F01D 21/003; F01D 21/04; F01D 25/26; F01D 5/3007; F01D 9/042;
(Continued)

(56) References Cited

U.S. PATENT DOCUMENTS

RE30,088 E      9/1979  Lund et al.
4,222,708 A  *  9/1980  Davison ................ F01D 25/243
                                            403/4
(Continued)

OTHER PUBLICATIONS

Tablet computer, Wikipedia, the free encyclopedia, Nov. 5, 2015 (Year: 2015).*

(Continued)

*Primary Examiner* — Kyle R Quigley
(74) *Attorney, Agent, or Firm* — Hoffman Warnick LLC

(57) ABSTRACT

A system for determining eccentricity of a turbine shell and a turbine rotor of a gas turbine includes a laser module with a microprocessor having coupled thereto a wireless network chip, a laser sensor, an inclination sensor, and a power supply. The laser sensor transmits a laser toward the turbine shell as the rotor spins at slow speed and to receive a reflected laser from the turbine shell, thereby defining a path length indicative of a distance between the laser module and the turbine shell for each of a series of points disposed circumferentially around the turbine shell. The system further includes a bracket configured to hold the laser module proximate to a turbine blade; a base station that produces a wireless network near the turbine shell and that receives distance measurements from the laser module for each of the series of points; and a server for processing the distance measurements into an eccentricity plot.

19 Claims, 17 Drawing Sheets

(52) U.S. Cl.
CPC .... *F05D 2260/30* (2013.01); *F05D 2270/305* (2013.01); *F05D 2270/54* (2013.01); *F05D 2270/804* (2013.01); *F05D 2270/807* (2013.01); *F05D 2270/821* (2013.01)

(58) Field of Classification Search
CPC .......... F05D 2230/72; F05D 2250/312; F05D 2260/30; F05D 2260/83; F05D 2270/305; F05D 2270/54; F05D 2270/804; F05D 2270/807; F05D 2270/821; G01B 11/14; G01B 11/27
See application file for complete search history.

(56) References Cited

U.S. PATENT DOCUMENTS

| | | | |
|---|---|---|---|
| 4,644,261 A | 2/1987 | Carter | |
| 5,457,745 A * | 10/1995 | Wang | B60R 11/0241 |
| | | | 379/426 |
| 6,224,332 B1 | 5/2001 | Leach et al. | |
| 6,839,979 B1 | 1/2005 | Godbole et al. | |
| 7,081,606 B2 | 7/2006 | Osaragi et al. | |
| 7,579,844 B2 | 8/2009 | Ducheminsky et al. | |
| 7,836,772 B2 | 11/2010 | Twerdochlib | |
| 8,023,269 B2 | 9/2011 | Mitchell et al. | |
| 8,092,080 B2 | 1/2012 | Mitchell et al. | |
| 8,167,259 B2 * | 5/2012 | Spang, Jr. | A61M 39/283 |
| | | | 248/218.4 |
| 8,220,990 B2 | 7/2012 | Mitchell et al. | |
| 8,223,036 B2 | 7/2012 | Mitchell et al. | |
| 8,400,501 B2 | 3/2013 | Heyworth et al. | |
| 8,519,866 B2 | 8/2013 | Mitchell et al. | |
| 8,525,036 B2 | 9/2013 | Mitchell et al. | |
| 8,527,241 B2 | 9/2013 | Mitchell et al. | |
| 8,599,082 B2 | 12/2013 | Mitchell et al. | |
| 8,629,783 B2 | 1/2014 | Mitchell et al. | |
| 8,797,179 B2 | 8/2014 | Subramanian et al. | |
| 9,068,906 B2 | 6/2015 | Silieti et al. | |
| 9,071,888 B2 | 6/2015 | Subramanian et al. | |
| 9,206,672 B2 | 12/2015 | Cooley et al. | |
| 9,250,153 B2 | 2/2016 | Prabhu et al. | |
| 9,325,388 B2 | 4/2016 | Bevly et al. | |
| 9,476,318 B2 | 10/2016 | Datchanamoorthy et al. | |
| 9,513,117 B2 | 12/2016 | Ruhge et al. | |
| 9,587,511 B2 | 3/2017 | Willett et al. | |
| 9,957,829 B2 * | 5/2018 | Shepherd | F01D 25/24 |
| 2007/0025850 A1 * | 2/2007 | Meacham | F04D 29/059 |
| | | | 415/229 |
| 2009/0037121 A1 * | 2/2009 | Muralidharan | F01D 25/285 |
| | | | 702/35 |
| 2013/0283907 A1 * | 10/2013 | Kang | B66B 1/3492 |
| | | | 73/504.02 |
| 2014/0289299 A1 | 9/2014 | Valente | |
| 2015/0167487 A1 * | 6/2015 | Willett, Jr. | G01B 11/14 |
| | | | 415/118 |

OTHER PUBLICATIONS

Computer Hope, What is a Power Switch, Apr. 26, 2017 (Year: 2017).*

* cited by examiner

SYSTEM AND METHOD FOR MEASURING ECCENTRICITY OF TURBINE SHELL RELATIVE TO TURBINE ROTOR

TECHNICAL FIELD

The disclosure relates generally to gas turbines having a turbine casing or shell, and more particularly, to a system and a method for measuring the eccentricity of the turbine shell in relation to the turbine rotor.

BACKGROUND

Some conventional turbo machines, such as gas turbine systems, are utilized to generate electrical power. In general, gas turbine systems include a compressor, one or more combustors, and a turbine. Air may be drawn into a compressor, via its inlet, where the air is compressed by passing through multiple stages of rotating blades and stationary nozzles. The compressed air is directed to the one or more combustors, where the fuel/air mixture is ignited and burned to form combustion products, which function as the operational fluid of the turbine. The operational fluid then flows through a fluid flow path that is defined between a plurality of rotating blades and a plurality of stationary nozzles disposed between the rotating blades, such that each set of rotating blades and each corresponding set of stationary nozzles defines a turbine stage. Some turbines used for electrical power generation may have three stages, while others may have four stages. As the plurality of rotating blades rotate the rotor of the gas turbine system, a generator, coupled to the rotor, may generate power from the rotation of the rotor.

Ensuring proper alignment of the turbine rotor to the turbine shell allows the turbine to operate most efficiently, reduces the likelihood of blade tips rubbing on the turbine shell, and reduces the likelihood of uneven part wear that may result from uneven air flows through the gas turbine. The alignment process is performed during initial installation of the gas turbine and may also be performed during outages in which the turbine and/or rotor have been moved. The ability to the operator of the gas turbine to correct misalignment and/or undesirable clearances between the turbine blades and the shell of the turbine ensures operational efficiency and preserves power generation output.

In conventional gas turbines where the turbine casing or shell is defined by a single wall, measuring the eccentricity (or alignment in X/Y planes) has been accomplished relatively easily by installing a measurement device on a turbine shell and measuring the clearance distance between the shell and blade, as the rotor containing the blade is rotated at a slow speed.

However, for gas turbines having a double-wall turbine shell with an inner turbine shell and an outer turbine shell, a more sophisticated system is needed to measure the eccentricity of the inner turbine shell relative to the turbine rotor within the space constraints of such a turbine. Because of the restricted spacing of the turbine blades (both relative to one another and relative to the neighboring stationary nozzles), any proposed system for making measurements to determine eccentricity is limited in size in its various dimensions.

SUMMARY

A system for determining eccentricity of a turbine shell relative to a turbine rotor of a gas turbine is described herein. The system includes a first laser module having a housing and contained within the housing a microprocessor having coupled thereto a wireless network chip, a laser sensor, an inclination sensor, and a power supply. The laser sensor is configured to transmit a laser beam toward the turbine shell as the turbine rotor spins at a slow speed and to receive a reflected laser beam from the turbine shell, thereby defining a path length indicative of a distance between the laser module and the turbine shell for each of a first series of points disposed circumferentially around the turbine shell. An early-stage bracket is configured to hold the laser module proximate to an early-stage turbine blade connected to the turbine rotor, the early-stage turbine blade being disposed in a first turbine stage or a second turbine stage. A base station is configured to produce a wireless local area network near the turbine shell and to receive distance measurements from the laser module for each of the first series of points, and a server processes the distance measurements into an eccentricity plot of the first turbine stage or the second turbine stage.

The system may further include a second laser module identical to the first laser module, and a second bracket configured to hold the second laser module proximate to a last-stage turbine blade connected to the turbine rotor.

A method for determining eccentricity of a turbine shell relative to a turbine rotor of a gas turbine is also provided herein. The method includes: (a) installing a first bracket to an early-stage turbine blade connected to the turbine rotor and installing a first laser module to the first bracket; (b) establishing, via a base station having a wireless chip, a wireless local area network proximate to the turbine shell; (c) spinning the turbine rotor at a slow speed to cause rotation of the turbine blade; (d) taking a first series of measurements of respective distances between the first laser module and the turbine shell by repeatedly directing a laser beam from a laser sensor of the first laser module toward the turbine shell as the turbine rotor spins and receiving a reflected laser beam from the turbine shell, thereby defining a path length indicative of a respective distance between the first laser module and the turbine shell for each of a first series of points disposed circumferentially around the turbine shell; (e) transmitting the respective distance for each of the first series of points to a server, the server performing calculations and generating an eccentricity plot for an early turbine stage, the early turbine stage being a first turbine stage or a second turbine stage; and (f) delivering the eccentricity plot for the early turbine stage to a remote computing device for review to determine if the eccentricity plot is within a predetermined specification.

BRIEF DESCRIPTION OF THE DRAWINGS

The specification, directed to one of ordinary skill in the art, sets forth a full and enabling disclosure of the present system and method, including the best mode of using the same. The specification refers to the appended figures, in which.

DETAILED DESCRIPTION

To clearly describe the current eccentricity measurement system, certain terminology will be used to refer to and describe relevant machine components within the scope of this disclosure. To the extent possible, common industry terminology will be used and employed in a manner consistent with the accepted meaning of the terms. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, as described below. As used herein, "downstream" and "upstream" are terms that indicate a direction relative to the flow of a fluid, such as the working fluid through the turbine engine. The term "downstream" corresponds to the direction of flow of the fluid, and the term "upstream" refers to the direction opposite to the flow (i.e., the direction from which the fluid flows). The terms "forward" and "aft," without any further specificity, refer to relative position, with "forward" being used to describe components or surfaces located toward the front (or compressor) end of the engine, and "aft" being used to describe components located toward the rearward (or turbine) end of the engine. Additionally, the terms "leading" and "trailing" may be used and/or understood as being similar in description as the terms "forward" and "aft," respectively. "Leading" may be used to describe, for example, a surface of a turbine blade over which a fluid initially flows, and "trailing" may be used to describe a surface of the turbine blade over which the fluid finally flows.

Figure 1:
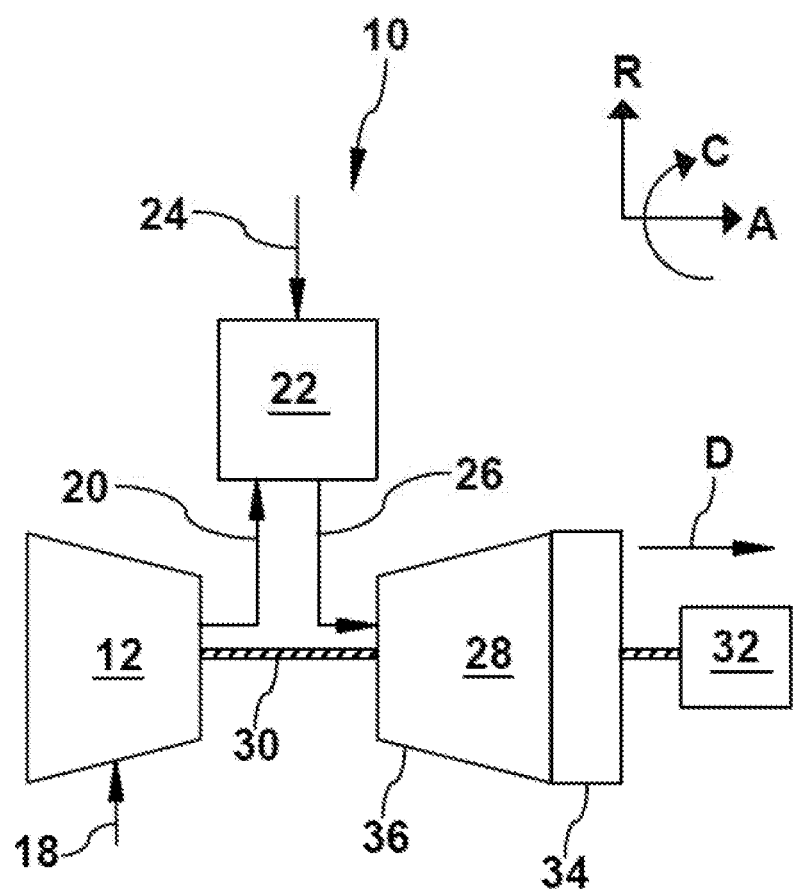
FIG. 1 is a schematic diagram of a gas turbine system in which the present eccentricity measurement system may be employed.

It is often required to describe parts that are at differing radial, axial and/or circumferential positions. As shown in FIG. 1, the "A" axis represents an axial orientation. As used herein, the terms "axial" and/or "axially" refer to the relative position/direction of objects along axis A, which is substantially parallel with the axis of rotation of the turbine system (in particular, the rotor section). As further used herein, the terms "radial" and/or "radially" refer to the relative position or direction of objects along an axis "R", which is substantially perpendicular with axis A and intersects axis A at only one location. Finally, the term "circumferential" refers to movement or position around axis A (e.g., axis "C"). The term "circumferential" may refer to a dimension extending around a center of any suitable shape (e.g., a polygon) and is not limited to a dimension extending around a center of a circular shape.

The disclosure relates generally to gas turbines having a turbine casing or shell, and more particularly, to a system and method for measuring the eccentricity of the turbine shell in relation to the turbine rotor. Such measurements may be necessary during manufacturing and during outages, when the gas turbine is otherwise inactive (e.g., during an inspection or maintenance period). The present disclosure describes a system that determines turbine shell eccentricity relative to the turbine rotor by taking measurements at an early turbine stage (for example, either a first turbine stage or a second turbine stage). Accordingly, reference made herein to "an early stage" is intended to describe the first turbine stage (stage-one) or the second turbine stage (stage-two), unless specific context dictates otherwise.

Various embodiments of the system and method are discussed below with reference to FIGS. 1-20. However, those skilled in the art will readily appreciate that the detailed description given herein with respect to these Figures is for explanatory purposes only and should not be construed as limiting.

FIG. 1 shows a schematic view of an illustrative gas turbine system 10. The gas turbine system 10 may include a compressor 12, which compresses an incoming flow of air 18. The compressor 12 delivers a flow of compressed air 20 to a combustor 22. The combustor 22 mixes the flow of compressed air 20 with a flow of fuel 24 and ignites the mixture to create a flow of combustion gases 26. Although only a single combustor 22 is shown, the gas turbine system 10 may include any number of combustors 22. The flow of combustion gases 26 is in turn delivered to a turbine 28, which typically includes a plurality of rotating turbine blades (FIG. 2) and stationary stator vanes. The flow of combustion gases 26 drives the turbine 28 to produce mechanical work. The mechanical work produced in turbine 28 drives the compressor 12, via a rotor 30 extending through the turbine 28, and may be used to drive an external load 32, such as an electrical generator and/or the like.

The gas turbine system 10 may also include an exhaust frame 34. As shown in FIG. 1, the exhaust frame 34 may be positioned adjacent to the turbine 28 of the gas turbine system 10. More specifically, the exhaust frame 34 may be positioned adjacent to, and substantially downstream of, the turbine 28. As discussed herein, a portion (e.g., outer casing) of the exhaust frame 34 may be coupled directly to an enclosure or shell 36 of the turbine 28.

After the combustion gases 26 flow through and drive the turbine 28, the combustion gases 26 may be exhausted, flow-through and/or be discharged through the exhaust frame 34 in a flow direction (D). In the non-limiting example shown in FIG. 1, the combustion gases 26 may flow through the exhaust frame 34 in the flow direction (D) and may be discharged from the gas turbine system 10 (e.g., to the atmosphere). In another non-limiting example where the gas turbine system 10 is part of a combined cycle power plant (e.g., including the gas turbine system and a steam turbine system), the combustion gases 26 may discharge from the exhaust frame 34, and may flow in the flow direction (D) into a heat recovery steam generator of the combined cycle power plant.

Figure 2:
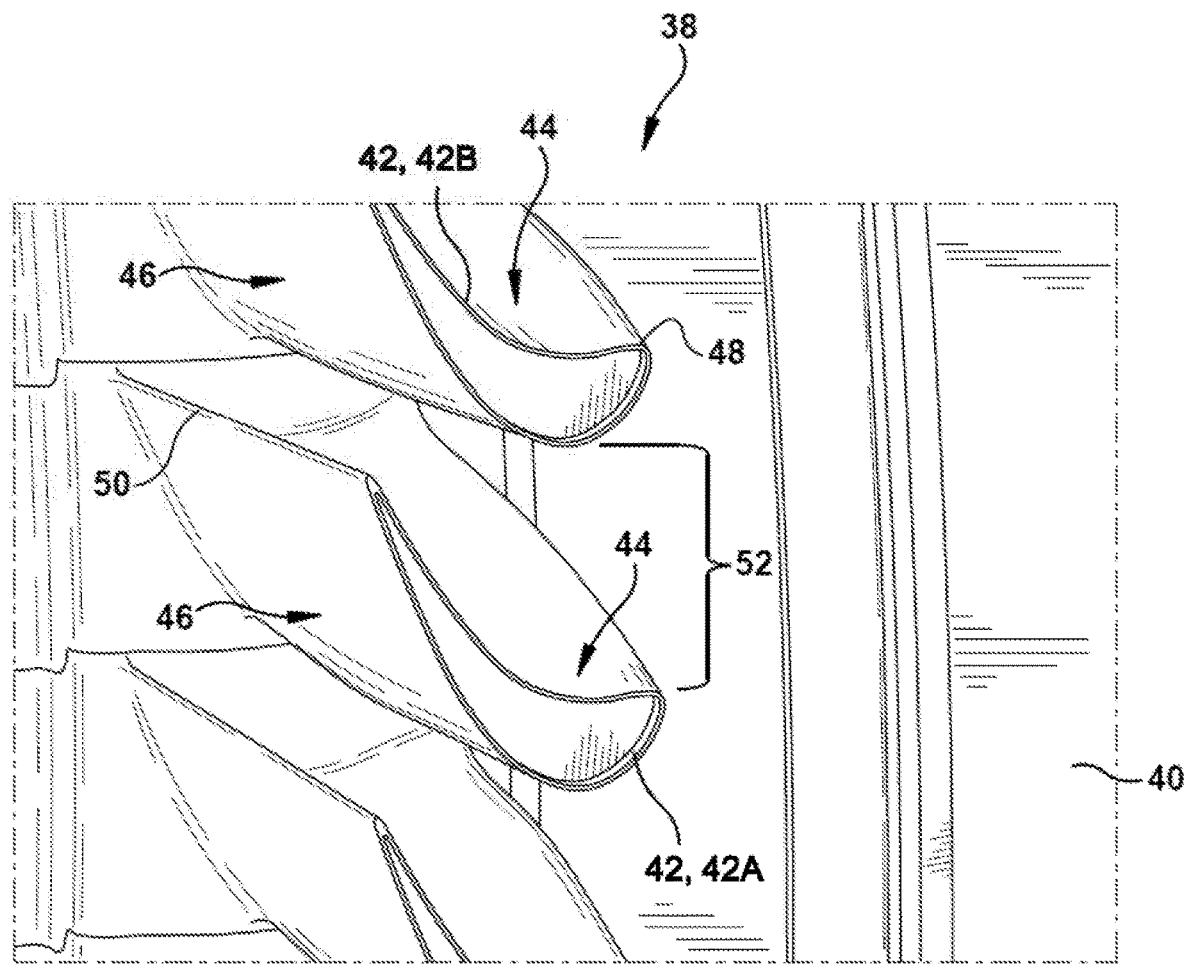
FIG. 2 is a perspective view of a portion of a turbine of the gas turbine system of FIG. 1, illustrating exemplary turbine blades, stator vanes, and rotor.

Turning to FIG. 2, and with continued reference to FIG. 1, a portion of gas turbine system 10 is shown. Specifically, FIG. 2 shows a portion of the gas turbine system 10, including an early stage of rotating turbine blades 38 and an early stage of stationary stator vanes 40 (e.g., a first stage or a second stage) coupled to the shell 36 of the turbine 28. As discussed herein, the rotor 30 may include a plurality of turbine blades 38 that may be coupled to and positioned circumferentially around the rotor 30 and may be driven by the combustion gases 26 to rotate the rotor 30. Each turbine blade 38 of the turbine 28 may include an airfoil 42 extending radially from the rotor 30 and positioned within the flow path of the combustion gases 26 flowing through the turbine 28. Airfoils 42 may also be positioned axially adjacent to the stator vanes 40 of the turbine 28.

In the non-limiting example shown in FIG. 2, only a few of the turbine blades 38 and one of the stator vanes 40 of the early stage are shown for clarity. Additionally, although only a portion of the early stage of the turbine blades 38 and the stator vanes 40 of the turbine 28 are shown in FIG. 2, the turbine 28 may include a plurality of stages of turbine blades and stator vanes, positioned axially through the shell 36 of the turbine 28.

Each airfoil 42 of the turbine blades 38 may include a pressure side 44 and a suction side 46, respectively. Specifically, a first airfoil 42A and a second airfoil 42B may each include a pressure side 44 and a suction side 46 positioned opposite the pressure side 44. Additionally, each airfoil 42 may include a leading edge 48 and a trailing edge 50 positioned between the pressure side 44 and the suction side 46. That is, the leading edge 48 and the trailing edge 50, positioned opposite the leading edge 48, may separate, be positioned between, and/or define the pressure side 44 and the suction side 46 for each airfoil 42 of turbine 28.

As shown in FIG. 2, the pressure side 44 of the first airfoil 42A may be positioned circumferentially adjacent the suction side 46 of the second airfoil 42B. A gap or space 52 (hereinafter, "space 52") may also be formed between the first airfoil 42A and the second airfoil 42B, and more specifically, the pressure side 44 of first airfoil 42A and the suction side 46 of the second airfoil 42B. In some non-limiting examples discussed herein, a mounting apparatus may be positioned within the space 52 and/or between the first airfoil 42A and the second airfoil 42B of the turbine 28 (shown in FIG. 1).

Figure 3:
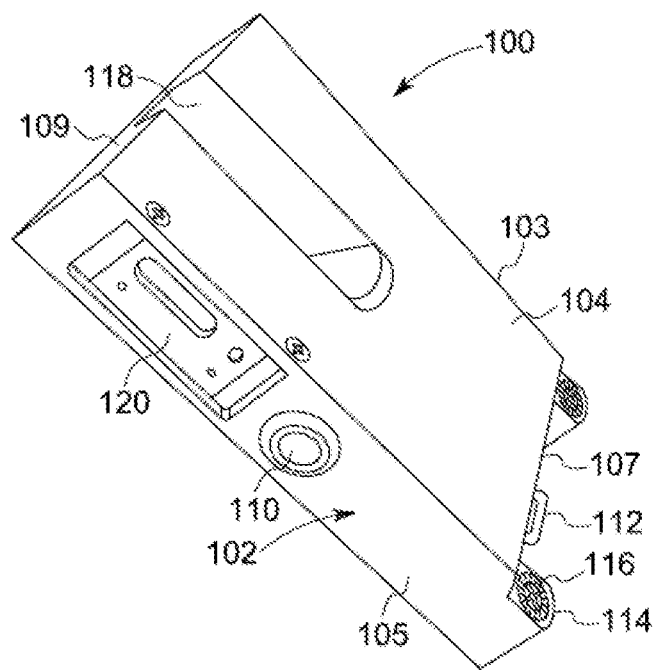
FIG. 3 is a side perspective view of a laser module used as part of an eccentricity measurement system of the present disclosure.
Figure 4:
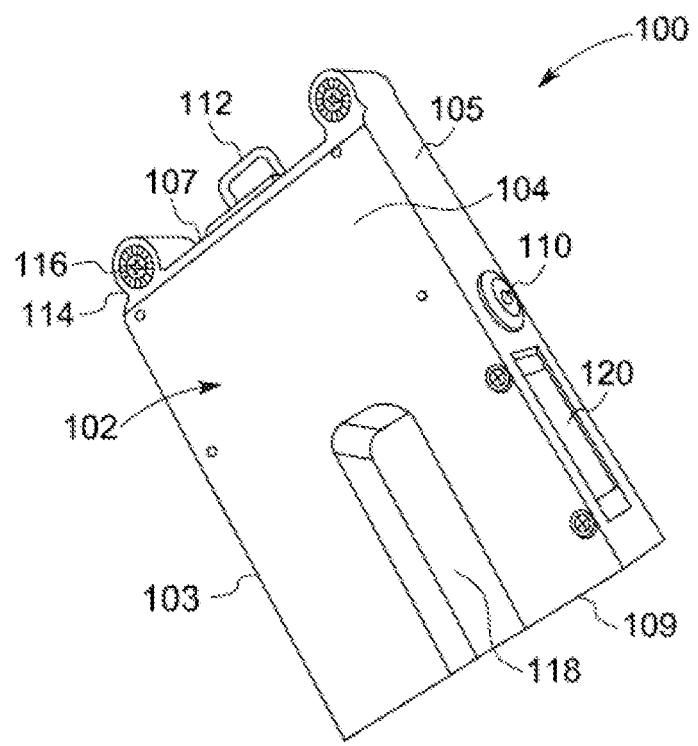
FIG. 4 is a perspective view of a back surface of the laser module of FIG. 3.
Figure 5:
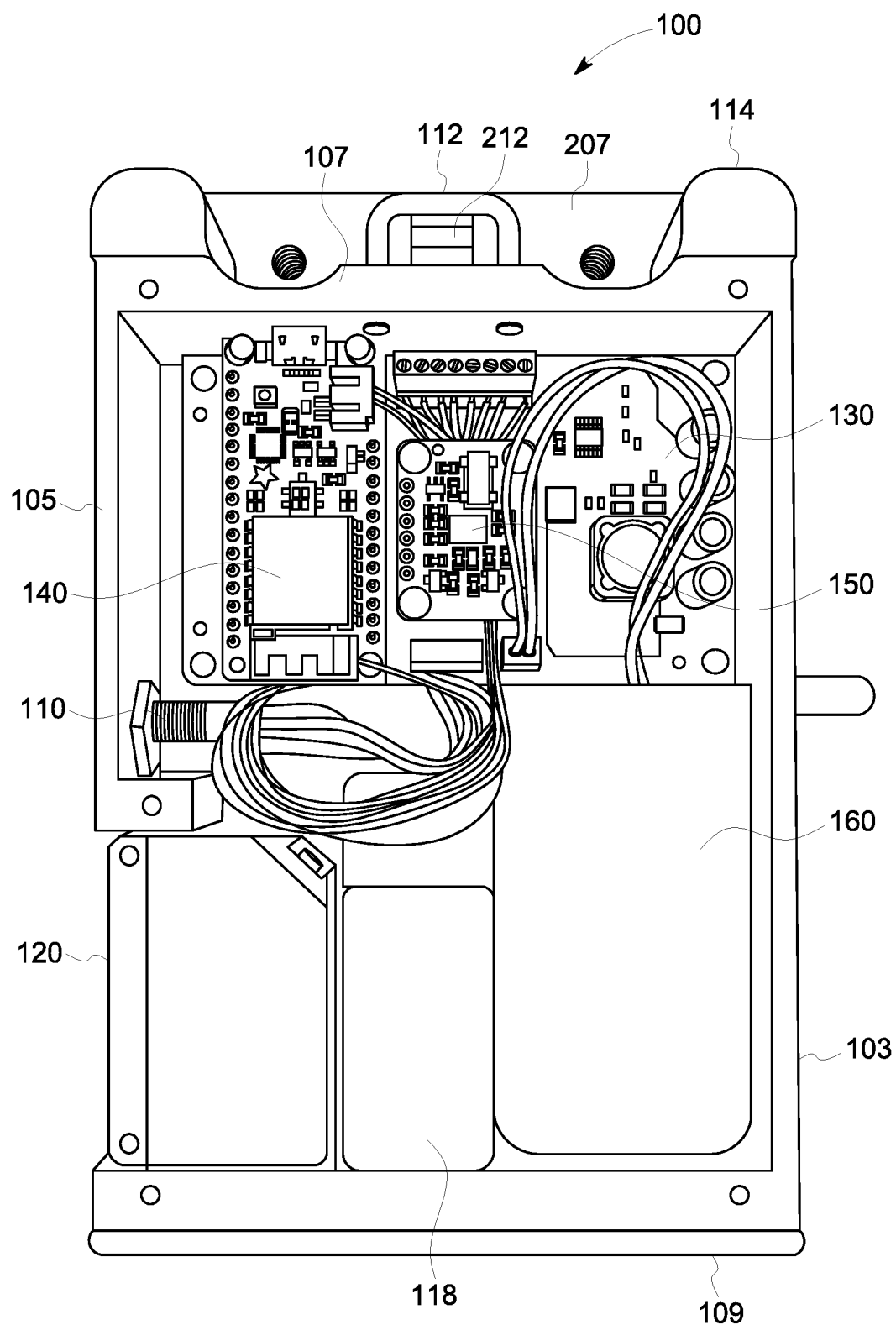
FIG. 5 is an overhead plan view of the laser module of FIG. 3, from which an outer cover has been removed to reveal interior components thereof.

FIGS. 3, 4, and 5 illustrate a laser module 100 that is used in the present system 1000 (shown in FIG. 20) to measure the eccentricity of the turbine rotor 30 relative to the turbine shell 36. The laser module 100 includes a housing 102 having a generally rectangular shape and a low profile (e.g., about one inch) to fit between adjacent airfoils 42. The housing 102 includes an upstream surface 104, a downstream surface 106 opposite the upstream surface (see FIGS. 7 and 8), a pair of oppositely disposed side walls 103, 105 connecting the longer sides of the downstream surface 104 and the upstream surface 106, and a pair of oppositely disposed end walls 107, 109 connecting the shorter sides of the downstream surface 104 and the upstream surface 106. When the laser module 100 is installed in the turbine 28, the upstream surface 104 is the surface that is proximate to the turbine inlet, and the downstream surface 106 is the surface that is proximate to the turbine exhaust 34.

A power button or switch 110 is positioned adjacent a laser sensor 120 on the side wall 105. The laser sensor 120 transmits a laser beam against the turbine shell 36 and captures the reflected laser beam, the laser path defining a distance between the laser module 100 and a point on the turbine shell 36 impacted by the laser beam. As the rotor 30 is turned and the turbine airfoil 42 to which the laser module 100 is attached is likewise rotated, the laser sensor 120 transmits the laser beam to a series of points along the turbine shell 36, and the capture of each reflected beam generates a set of distance measurements between the turbine shell 36 and the laser module 100.

Figure 6:
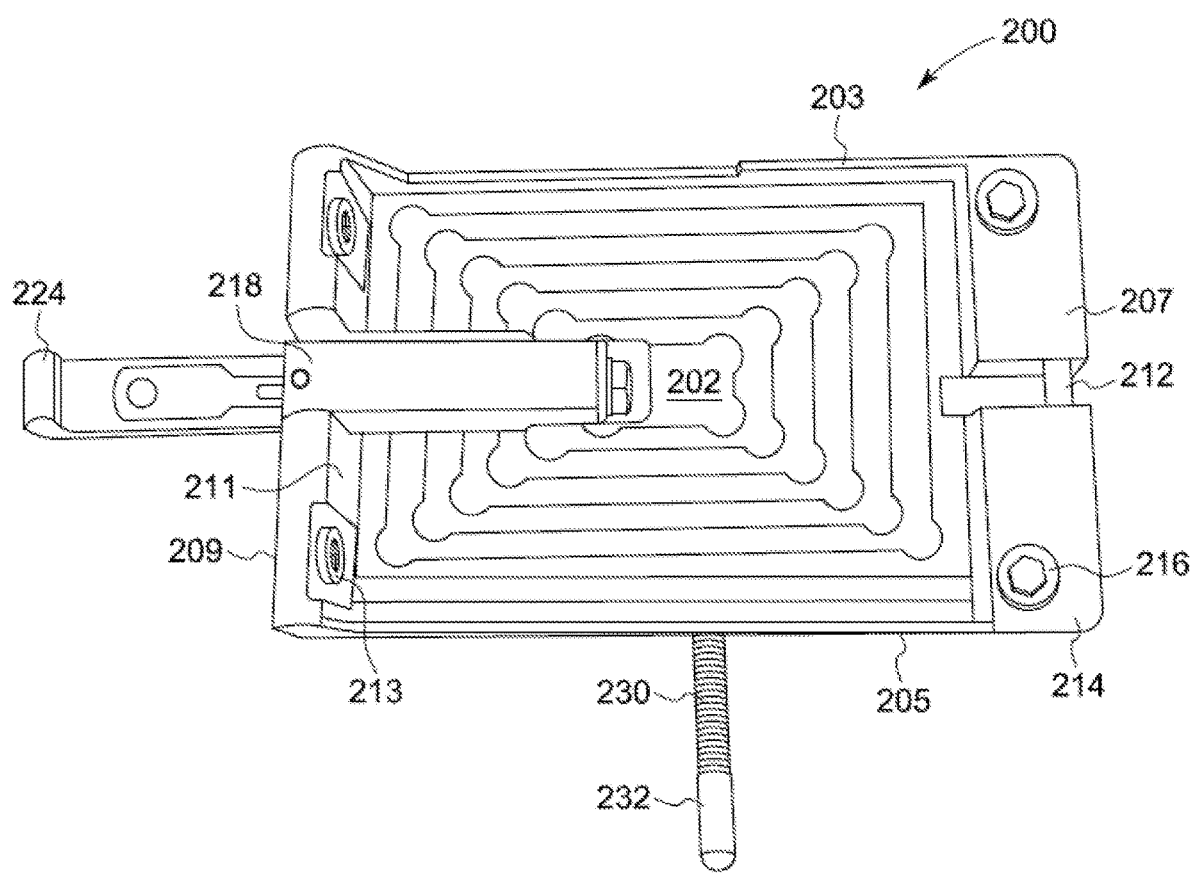
FIG. 6 is a plan view of an early-stage bracket, as may be used to position the laser module of FIGS. 3-5 proximate to an early-stage turbine blade.
Figure 10:
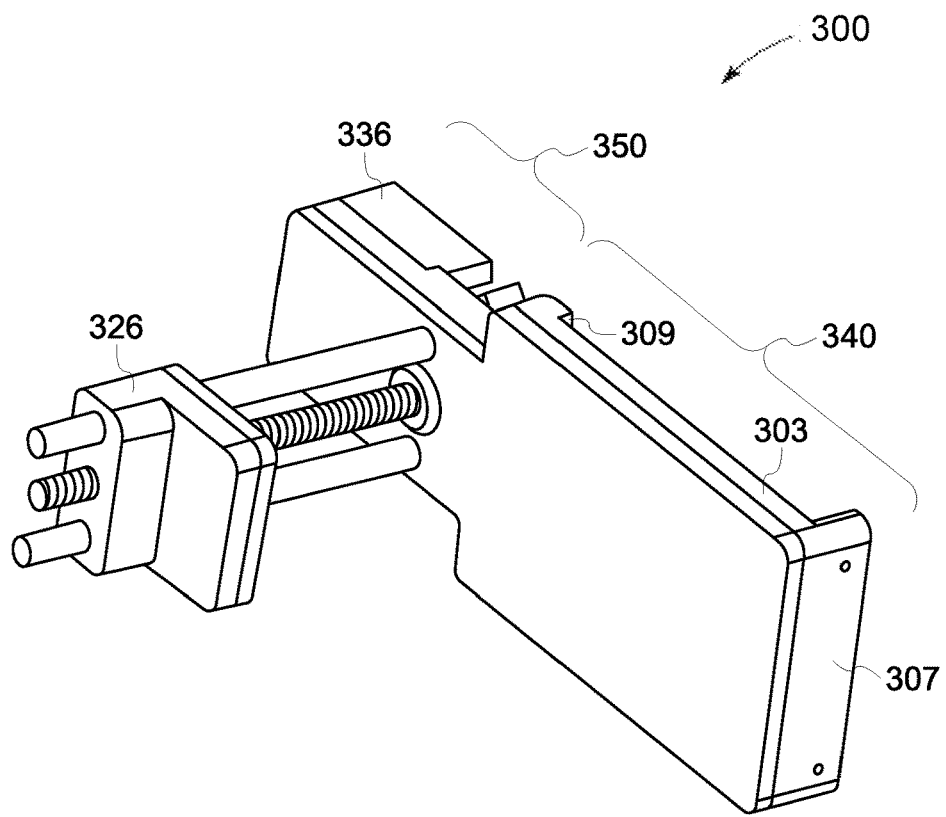
FIG. 10 is a perspective view of last-stage bracket, as may be used to position the laser module of FIGS. 3-5 proximate to a last-stage turbine blade.

The end wall 107 may be provided with a U-shaped hook 112 to facilitate installation and retrieval. The end wall 107 also includes a pair of ears 114 extending radially outward from the end wall 107, which may include magnets 116 to facilitate installation of the laser module 100 within a corresponding mounting bracket 200 or 300 (as shown in FIGS. 6 and 10). The upstream surface 104 may include a recessed portion 118 to accommodate the mounting bracket 200, 300.

The housing 102 may be manufactured of plastic using additive manufacturing techniques, such as three-dimensional printing. Alternately, the housing 102 may be manufactured by molding, casting, or other suitable techniques.

The downstream surface 106 of the housing 102 may be removeable from the housing 102 for accessing the interior thereof, as shown in FIG. 5. Screws or other attachment means may be used to connect the downstream surface 106 to the housing 102. As mentioned above, the side wall 105 includes the laser sensor 120, which is provided with a window flush with the side wall 105 and through which a laser projects. The laser module 120 and the power switch 110 are connected, via wires, to a circuit board 130. The circuit board 130 includes a microcontroller 140 and an inclination sensor, such as an accelerometer 150. The accelerometer 150 is used to continuously determine the angular position of the laser module 100 relative to gravity. The accelerometer 150 contains embedded algorithms to filter out non-gravitational effects, such as centripetal acceleration, which allows the present system 1000 to operate over a wide range of rotor speeds.

Figure 16:
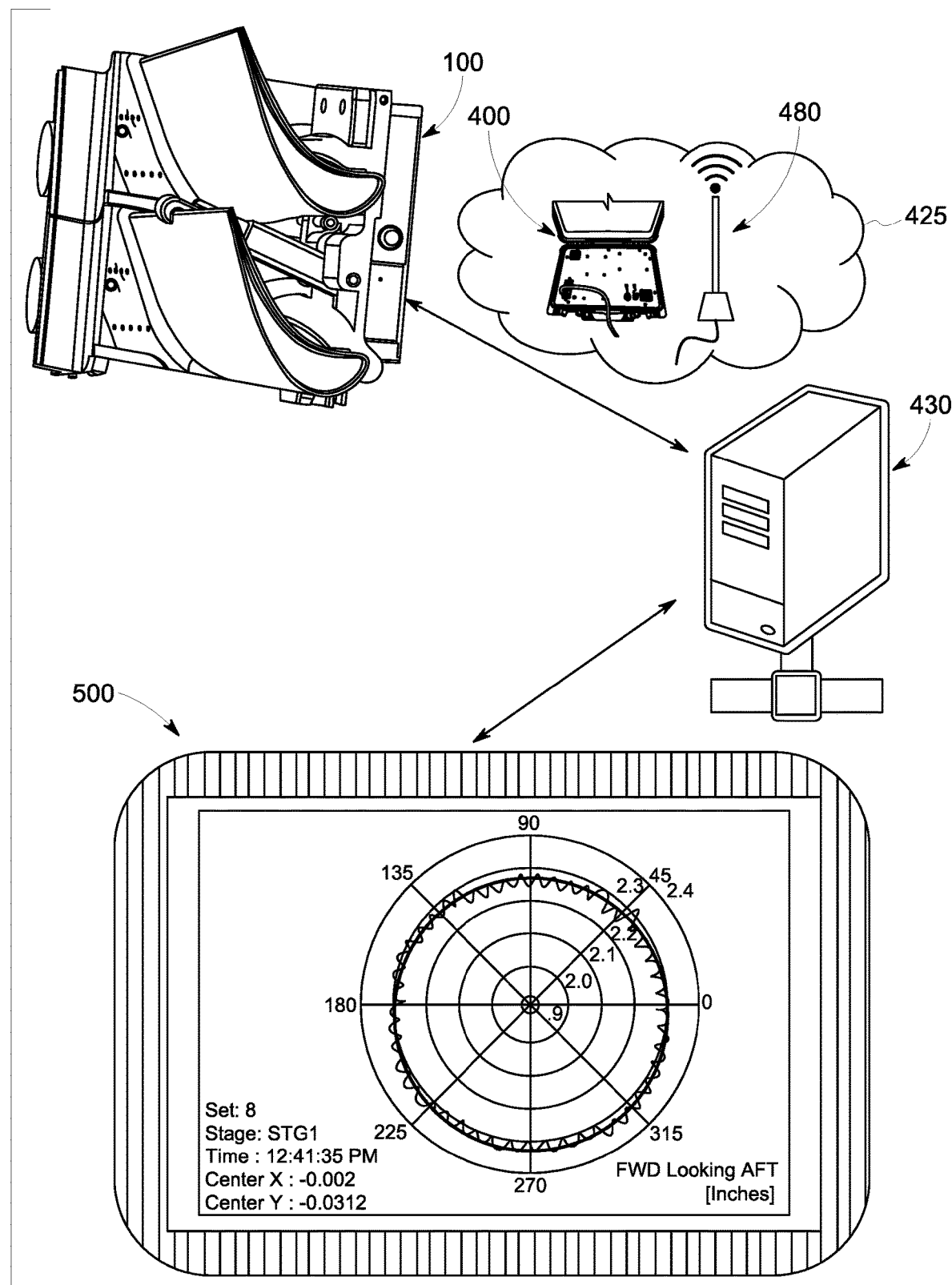
FIG. 16 is a schematic depiction of wireless communication between the present eccentricity measurement system and a remote computing device.

The microcontroller 140 includes a memory (not separately labeled) and a wireless internet (Wi-Fi) chip, although such chip may be separate from the microcontroller 140. The memory of the microcontroller 140 stores the data measurements over a defined measurement period (for example, 250 microseconds). At the end of the measurement period, the Wi-Fi chip permits the wireless transmission of (data) signals from the laser module 100 in a single message delivered to a remote device, such as a computer, tablet computer, or other smart device (as shown in FIG. 16, discussed below). The transmissions may be made over any suitable Wi-Fi network protocol, including, but not limited to, 802.11b, 802.11g, and 802.11n.

The circuit board 130 is also connected, via wires, to a rechargeable battery 160. The battery 160 may be rechargeable via a USB port (not shown) disposed in the side wall 103 or the end wall 109. If desired, the circuit board 130 may be connected to one or more LED lights (not shown) that indicate that the laser module 100 is turned on or that indicate a battery level of the battery 160.

FIG. 6 illustrates a bracket 200, as may be used to secure the laser module 100 in a fixed position to the airfoil 42 of an early stage (first or second stage) turbine blade 38. The bracket 200 has a generally rectangular body having a recessed primary attachment surface 202 of a size and shape complementary to that of the housing 102 of the laser module. The attachment surface 202 is bounded by oppositely disposed side walls 203, 205 and oppositely disposed end walls 207, 209 respectively positioned between the side walls 203, 205. The end walls 207, 209 extend radially outward from the attachment surface 202, creating a recess within which the laser module 100 fits.

The end wall 207 includes an end wall surface 214 parallel to the attachment surface 202 and on which a pair of magnets 216 are installed. An installation bar 212 is positioned at the center of the end wall 207. The end wall 209 includes an end wall surface 211 that is disposed perpendicularly to the attachment surface 202 and defines depressions within which additional magnets 213 are positioned. The magnets 216 engage the magnets 116 on the ears 114 of the laser module 100, and the magnets 213 engage magnets (not shown) on the end wall 109 of the laser module 100, thereby securing the laser module 100 to the bracket 200.

Figure 7:
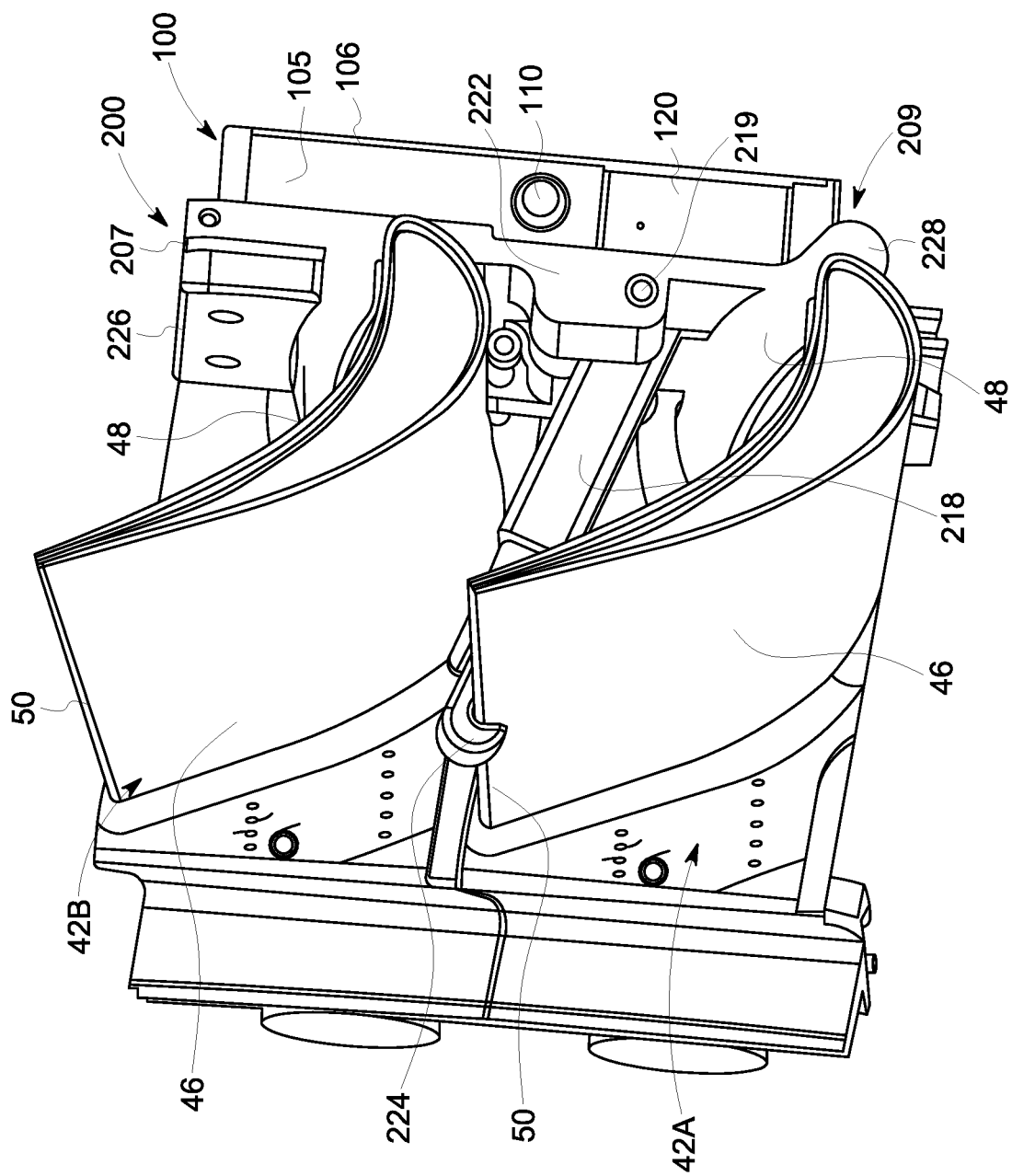
FIG. 7 is a side perspective view of the early-stage bracket of FIG. 6 and the laser module of FIGS. 3-5, as installed on an early-stage turbine blade.
Figure 8:
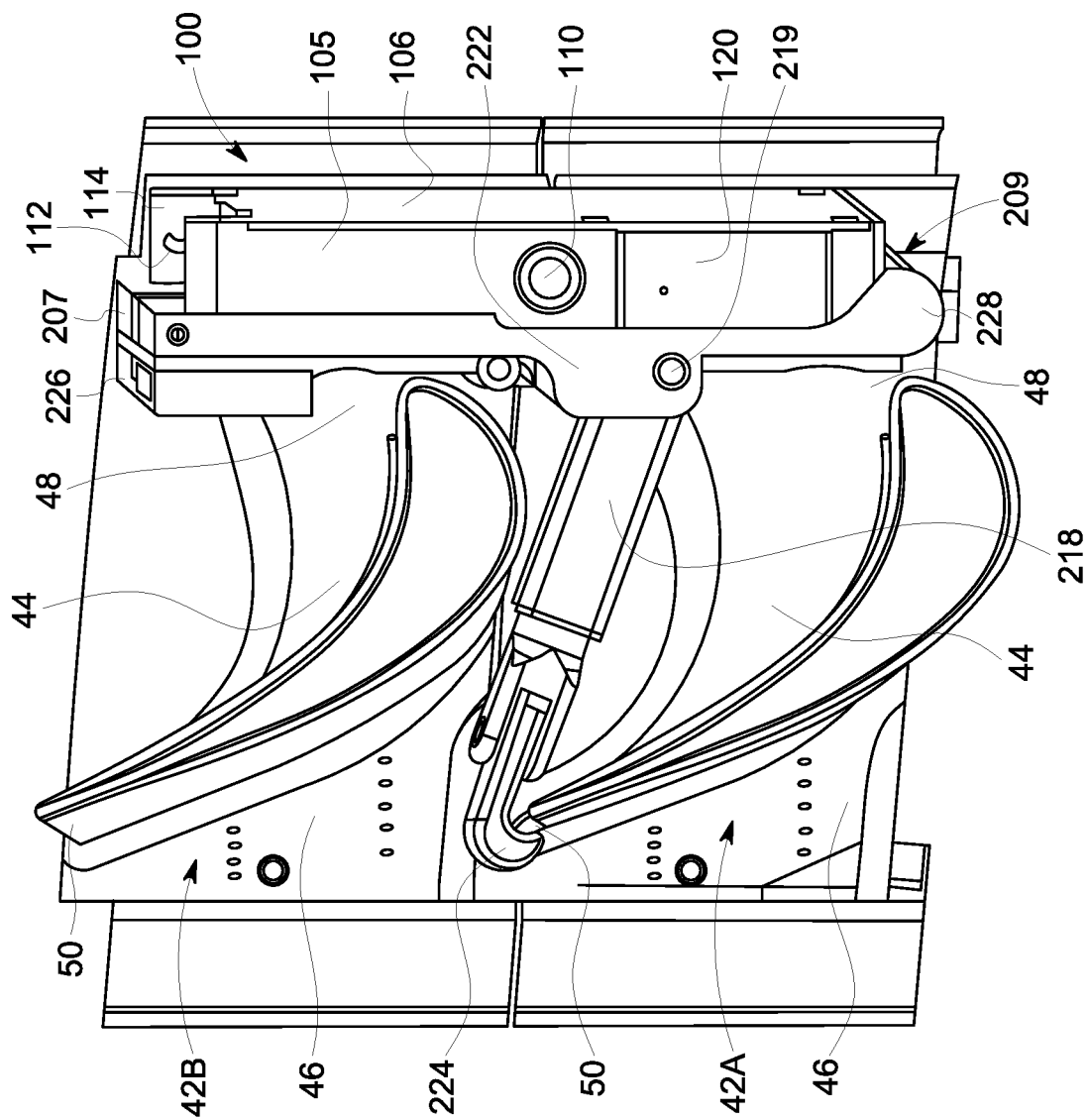
FIG. 8 is a side view of the components shown in FIG. 7.

With reference to FIGS. 6, 7, and 8, an extendable arm 218 is pivotably secured, using a pin 219 fixed to shoulders 222 disposed on the upstream surface (i.e., the surface opposite the recessed attachment surface 202). The arm 218 extends outward from the end wall 209. The extendable arm 218 is fitted with a hook 224 that is configured to engage the trailing edge 50 of a first turbine blade airfoil 42A and, more particularly, the trailing edge of a stage-one or stage-two turbine blade airfoil.

To further position the mounting bracket 200 in the space 52 between adjacent turbine airfoils 42A, 42B, a bracing element 226 may be provided on the upstream surface of the bracket 200 and may extend radially inwardly from the end wall 207 and may span circumferentially between the side walls 203 and 205. The bracing element 226 is configured to engage the leading edge 48 of the second turbine blade airfoil 42B, which is circumferentially adjacent to the first turbine blade airfoil 42A. The bracing element 226 is removably installed on the mounting bracket 200, such that different bracing elements 226 having shapes complementary to the leading edges 48 of turbine airfoils 42 of other engines may be used. The end wall 209 may be curved to form a second bracing element 228 that is positioned against the leading edge 48 of the first turbine blade airfoil 42A.

Figure 9:
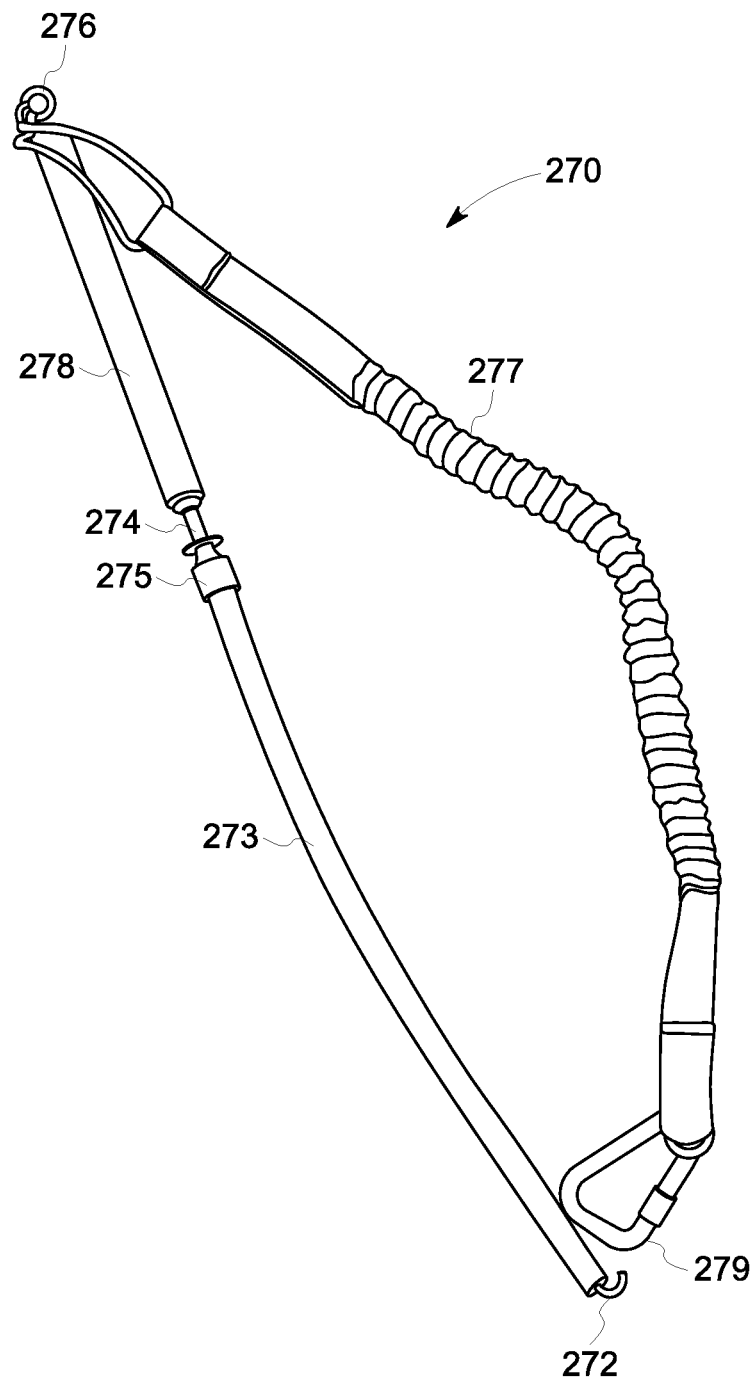
FIG. 9 is a perspective view of an installation tool, as may be used to install the early-stage bracket of FIG. 7 and the laser module of FIGS. 3-5.

The mounting bracket 200 is installed by manually directing the mounting bracket 200 between a pair of stator nozzles 40, using an installation tool 270 shown in FIG. 9. The installation tool 270 includes a hook 272 formed at a first end of a wire 274. At the opposite end of the wire 274, an eyelet 276 is formed. Proximate to the eyelet 276, a hollow rod 278 is provided, which provides a convenient handle to hold the installation tool 270. A flexible sheath 273 covers a portion of the wire 274 between an end of the hollow rod 278 distal to the eyelet 276 and the hook 272. The flexible sheath 273 is configured to slide along the wire 274 and its position along the wire 274 may be fixed by engaging a quick-connect flange 275. The installation tool 270 is further provided with an elastic safety band 277 that is connected at a first end to the eyelet 276 and at an opposite end to a carabiner-type clip 279. To prevent the technician from accidentally dropping the installation tool 270 within the turbine 28, the technician clips the carabiner 279 to his belt loop or other location.

To use the installation tool 270, the hook 272 is coupled to the installation bar 212 of the mounting bracket 200, and the mounting bracket 200 is directed between a pair of stator nozzles 40. A technician slides the flexible sheath 273 downward on the wire 274 and engages the quick-connect flange 275, such that the flexible sheath 273 engages and holds the installation bar 212 within the hook 272. The technician holds in one hand the hollow rod 278 or flexible sheath 273 to maintain the position of the mounting bracket 200, and with the other hand pivots the hook 224 of the extendable arm 218 into engagement with the trailing edge 50 of the first turbine blade airfoil 42A. The technician then aligns the bracing elements 226, 228 on the respective leading edges of the turbine blade airfoils 42B, 42A. The quick-connect flange 275 may be disengaged, and the installation tool 270 removed. A threaded post 230 having an end cap 232 (shown in FIG. 6) is manually adjusted to push against the root of the turbine blade 42B, further securing the mounting bracket 200.

Once the mounting bracket 200 is positioned securely, the technician may employ the installation tool 270 in a similar manner to direct the laser module 100 into position on the mounting bracket 200. The laser module 100, whose hook 112 is held in position on the hook 272 of the installation tool 270 by sliding the flexible sheath 273 downward and engaging the quick-connect flange 275, is turned on before being guided between the corresponding early-stage nozzles and lowered into place on the mounting bracket 200, where the magnets 213, 216 and bracing elements 226, 228 are fully engaged with the mounting bracket 200 and the leading edges 48 of the turbine airfoils 42B, 42A, respectively.

Figure 11:
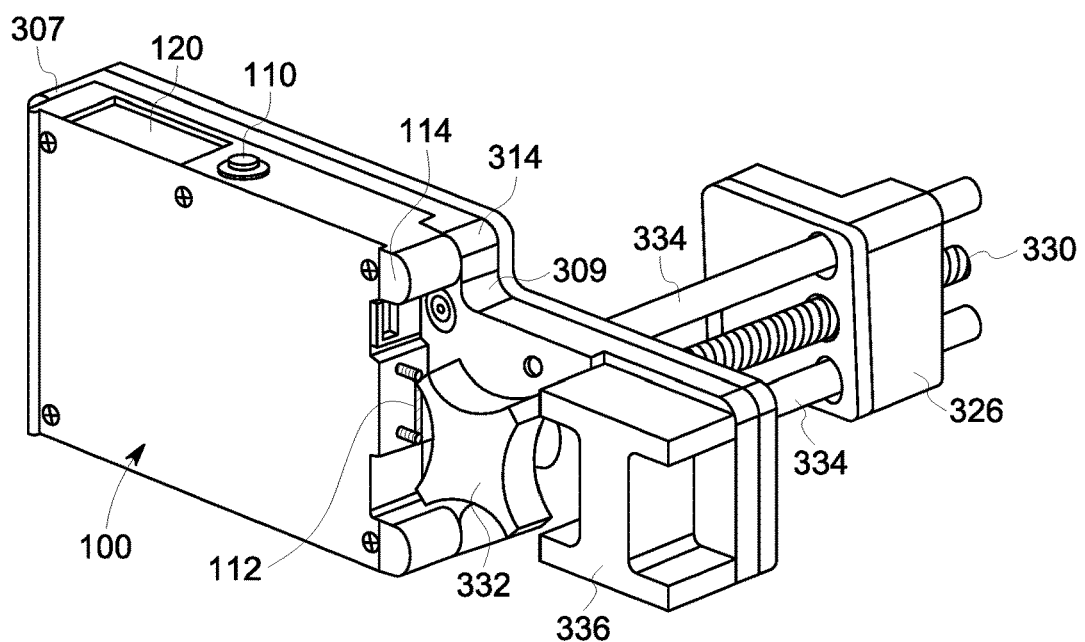
FIG. 11 is a perspective view of the last-stage bracket of FIG. 10, in which the laser module of FIGS. 3-5 has been inserted.

FIG. 10 illustrates a bracket 300, as may be used to secure the laser module 100 in a fixed position to an airfoil 342A, 342B of a last-stage turbine blade 38 (such as third-stage turbine blade in a three-stage turbine 28 or a fourth-stage turbine blade in a four-stage turbine 28). The bracket 300 includes a first rectangular area 340 having an attachment surface 302 on which the laser module 100 is installed (as shown in FIG. 11). The first rectangular area 340 includes a pair of oppositely disposed side walls 303, 305 and a pair of oppositely disposed end walls 307, 309 positioned respectively between the side walls 303, 305. The end wall 307 projects outwardly from the attachment surface 302 and defines a boundary of the attachment surface 302. As discussed above, the end wall 307 may be provided with magnets to engage complementary magnets on the laser module 100. The ears 114 of the housing 102 of the laser module 100 may also include magnets (not shown) that engage corresponding magnets on the end wall 309 (or at the corners 314 of the end wall 309 and the side walls 303, 305).

It should be noted that the first rectangular area 340 is configured with the same dimensions and features as those used in the early-stage bracket 200, such that the laser modules 100 are interchangeable between stages.

Figure 12:
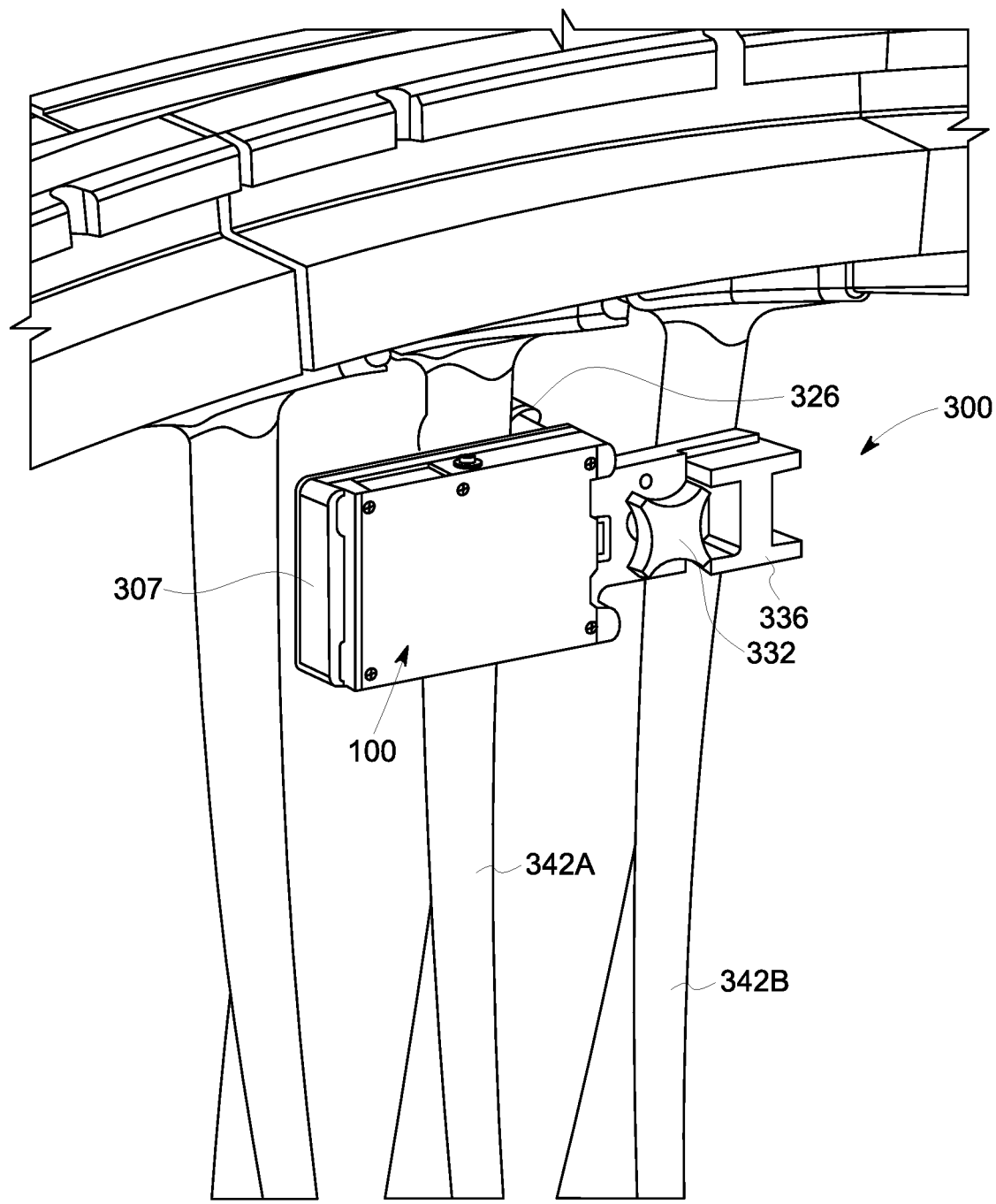
FIG. 12 is a perspective view of the last-stage bracket of FIG. 10 and the laser module of the FIGS. 3-5, as installed on a last-stage turbine blade.

The first rectangular area 340 is seamlessly integrated with a second rectangular area 350, which shares a common longitudinal axis (not separately labeled) with the first rectangular area 340. The second rectangular area 350, which has a width that is less than the width of the first rectangular area 340, contains the hardware for attaching the bracket 300 to the aft side of the airfoil 342A, as shown in FIG. 12. The second rectangular area 350 includes a threaded rod 330 that extends through a bracing element 326. The threaded rod 330 is connected, opposite the bracing element, to a handle 332 that can be rotated to alter the position of the threaded rod 330 and, thus, the bracing element 326. A pair of guide rods 334 help to secure the bracing element 326 and prevent it from becoming misaligned as the threaded rod 330 is tightened into position.

An I-shaped spacer tool 336 may be provided with the mounting bracket 300 to set the proper spacing between the mounting bracket 300 and the turbine shroud. The spacer tool 336 may be secured to the second rectangular area 350 with magnets, such that removal and replacement of the spacer tool 336 is convenient to the technician. Moreover, the magnetic connection between the spacer tool 336 and the mounting bracket 300 helps to ensure that the spacer tool 336 is available when the mounting bracket 300 is being installed.

FIG. 12 illustrates the mounting bracket 300 and the laser module 100 as installed on a first turbine airfoil 342A. The bracing element 326 is positioned on the upstream surface of the turbine airfoil 342A near the root. The handle 332 is turned to shorten the distance between the bracing element 326 and the first rectangular surface 340, until the first rectangular surface 340 contacts the first turbine airfoil 342A and the second rectangular surface 350 contacts the circumferentially adjacent second turbine airfoil 342B. When the mounting bracket 300 is secured in position, the laser module 100 may be attached using magnets provided for such purpose.

While the present disclosure describes the use of magnets to secure the laser module 100 to the mounting bracket 200 (or 300), it should be understood that other means of securing the laser module 100 may instead be used. Such means may include a latch/slot, a sliding element/track or slot, and disposable means, such as zip-ties or rubber bands.

Figure 13:
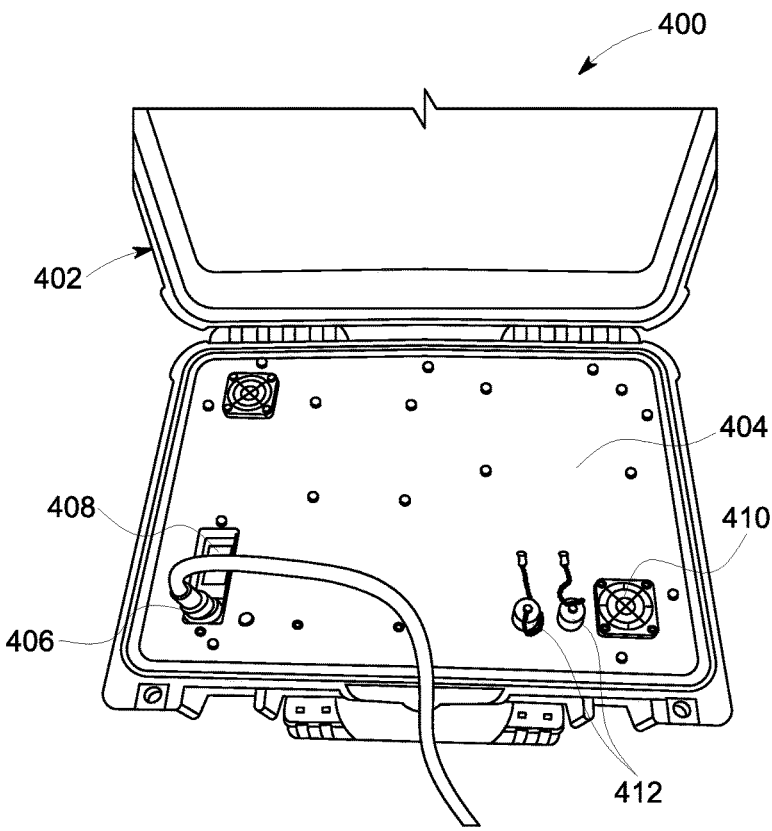
FIG. 13 is an overhead perspective view of a base station for use with the laser module of FIGS. 3-5.
Figure 14:
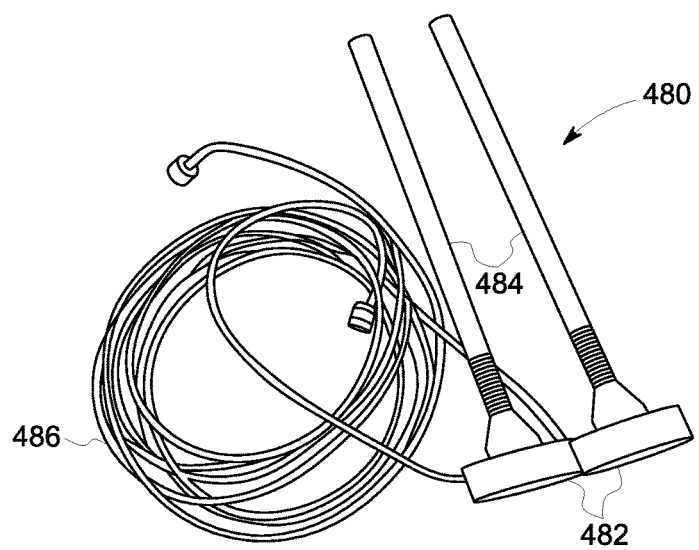
FIG. 14 is a perspective view of a pair of antennas for use with the base station of FIG. 13.

For the laser modules 100 to transmit data wirelessly to a remote device, such as a server and ultimately a remote device (such as a tablet computer), it is advantageous to employ a wireless local area network (WLAN). FIGS. 13 and 14 illustrate components of such a wireless network, including a base station 400 and a pair of antennas 480 to boost the wireless transmissions from the laser modules 100. The base station 400, which acts as a wireless router, is housed in a portable storage box 402. A protective shield 404 prevents damage to the circuit boards (not shown) that include a Wi-Fi chip and a microprocessor. The protective shield 404 includes an electrical outlet 406 and a switch 408. Fans 410 may be used to cool the circuit boards. A pair of antenna ports 412 are also provided.

Figure 15:
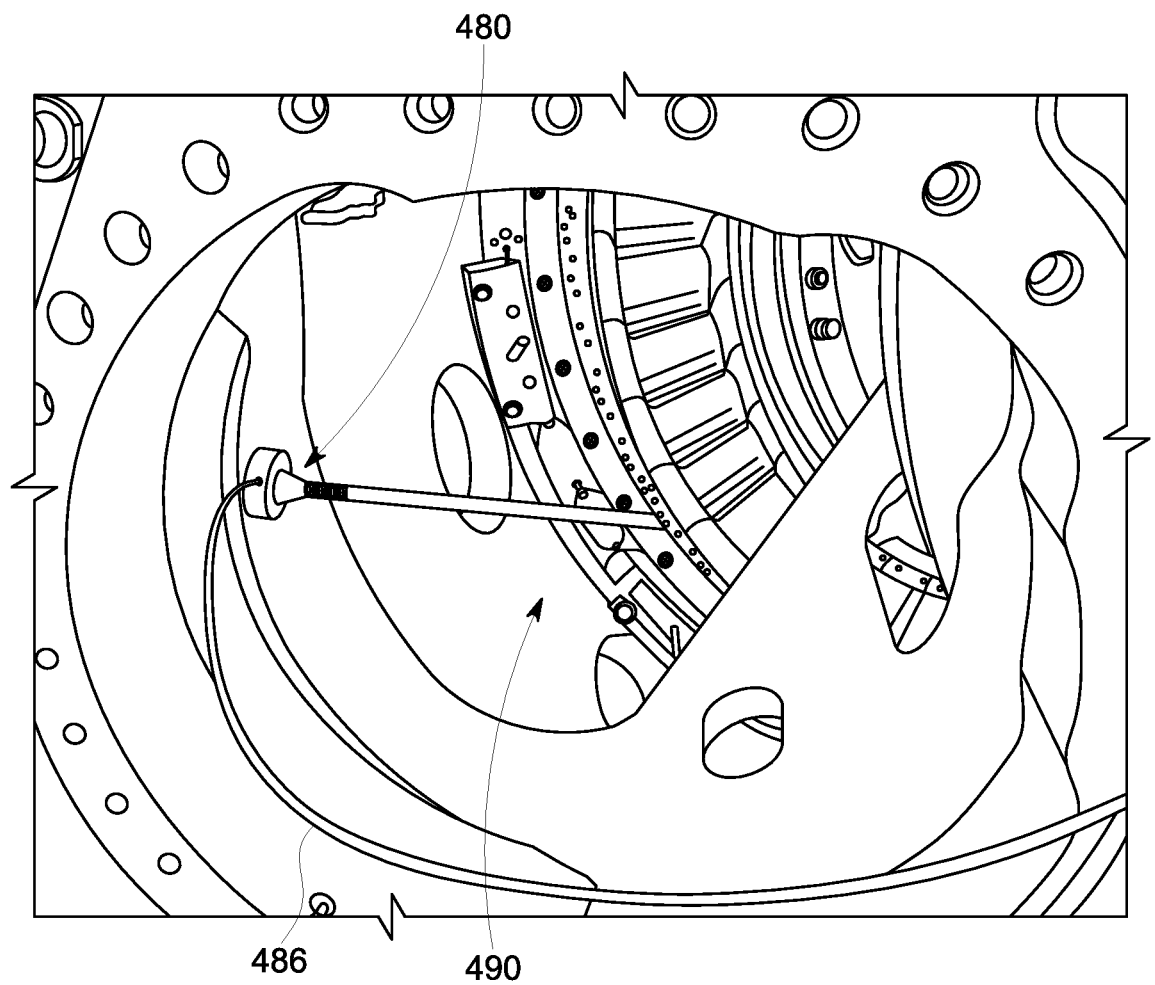
FIG. 15 is a perspective view of an aft end of a combustor, in which one of the antennas of FIG. 14 is installed.

FIG. 14 shows the antennas 480, each antenna 480 having a circular base 482 and an extended shaft 484. The base 482 may include a magnet to facilitate mounting at any desired angle within the gas turbine system 10. The antennas 480 are connected, via cables 486, to the antenna ports 412 of the base station 400. FIG. 15 illustrates an exemplary location of one of the antennas 480 within an annulus 490 between the combustor 22 and the turbine 28.

FIG. 16 is a schematic representation of the wireless communication between the laser module 100 and a remote computing device 500, such as a computer or tablet computer (as shown). The laser module 100 is secured to the turbine airfoil 42 (342), as described above, and the turbine rotor 30 is rotated at a slow speed (e.g., a speed less than 20 revolutions-per-minute, as may be associated with a "turning gear" driver). As the turbine airfoil 42 traverses around the rotor 30, the laser module 100 makes a series of measurements between its instantaneous position and various points around the turbine shell 36. The measurements are transmitted wirelessly, via the antennas 480, using a wireless local area network (WLAN) 425 produced by the base station 400. The measurements are received by a server 430, which performs calculations on the measurements to generate a data plot, as discussed below. The server 430 uses MQ telemetry transport (MQTT) messaging protocol, or another suitable messaging protocol, to communicate with an application loaded on the remote computing device 500, where the results may be reviewed by a technician.

Figure 17:
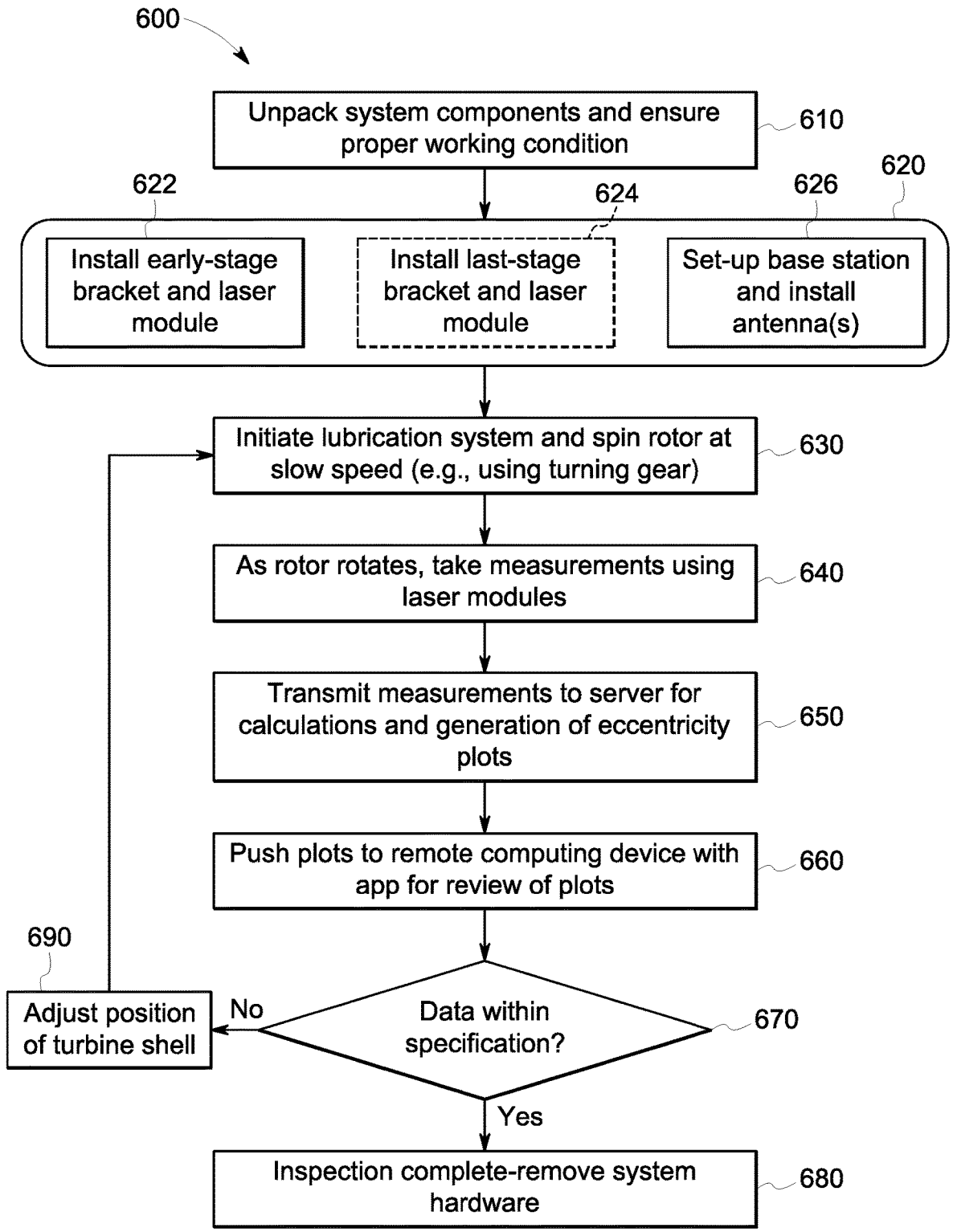
FIG. 17 is a flow chart outlining a process of using the present eccentricity measurement system to ensure alignment of a turbine shell with a rotor.

FIG. 17 is a flow chart outlining a process 600 of using the present eccentricity measurement system 1000 to ensure proper alignment of a turbine shell with a rotor. In step 610, the system 1000 containing the laser modules 100 and the base station 400 is unpacked and bench-tested to ensure the laser modules 100 and the base station 400 are in proper working order. In step 620, the system is set up and readied for use. Specifically, in step 622, the bracket 200 is installed on an early-stage airfoil (e.g., 42A), and a first laser module 100 is turned on and installed on the early-stage bracket 100. In step 624, which is optional, the last-stage bracket 300 is installed on a last-stage airfoil (e.g., 342A), and a second laser module 100 is turned on and installed on the bracket 300. In step 626, the base station 400 is set up near the turbine 38, and the antenna(s) 480 are mounted in appropriate locations within the turbine 28 and/or within the annulus 290 between the combustor 22 and the turbine 28 and are connected to antenna ports 412 of the base station 400. Step 626 may occur prior to or concurrently with step 622 (and/or step 624), depending on the number of technicians available.

Figure 18:
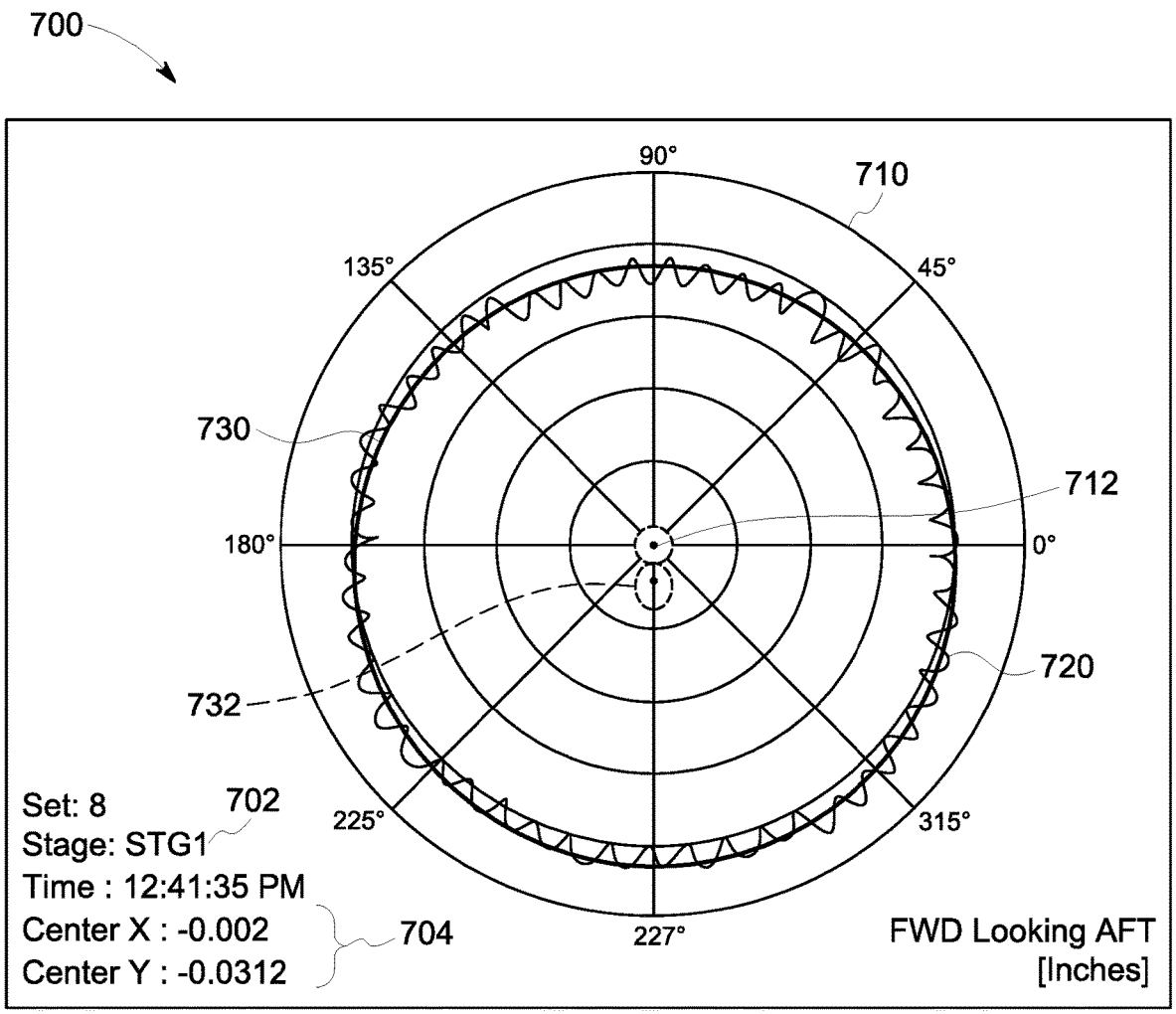
FIG. 18 is an exemplary pilot plot diagram of measurements made at turbine stage one, using the present eccentricity measurement system.
Figure 19:
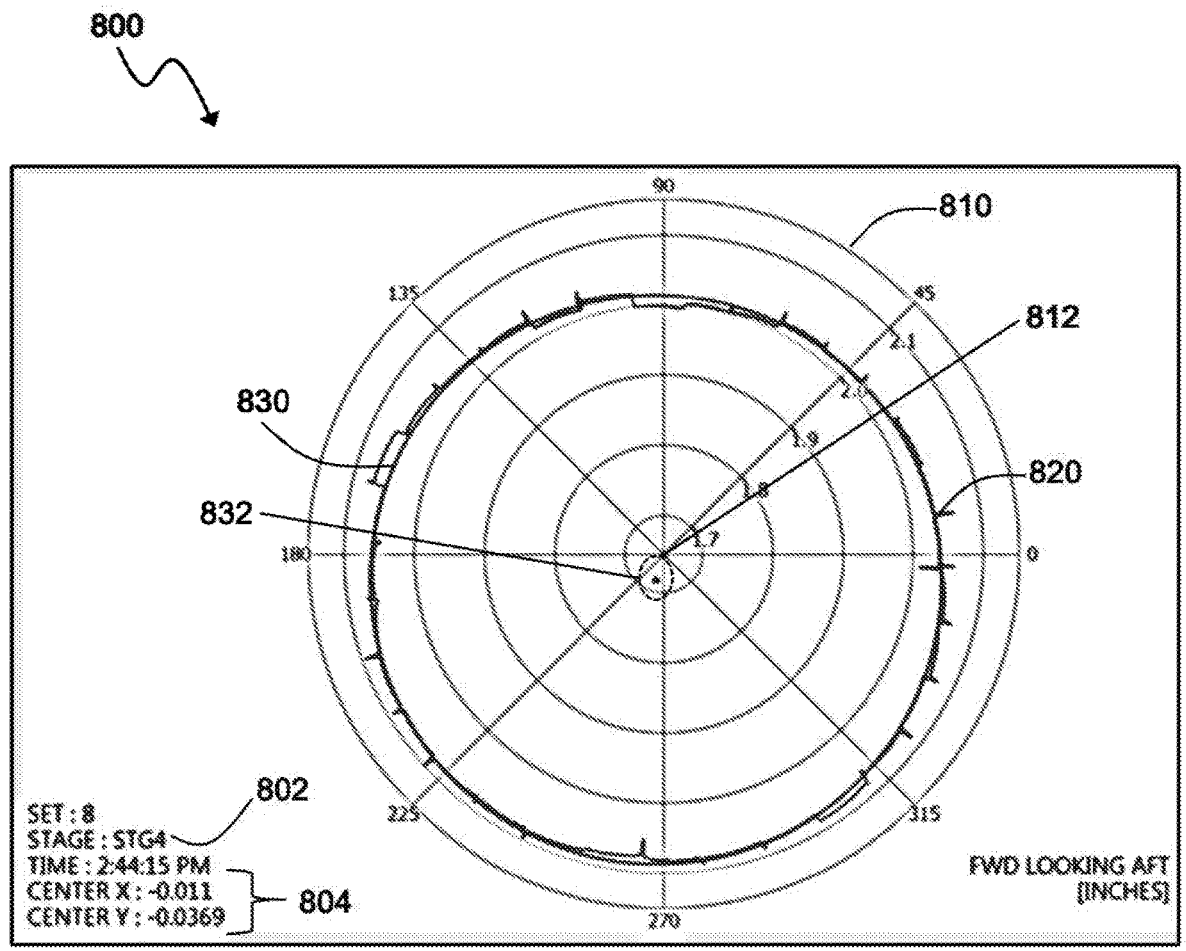
FIG. 19 is an exemplary pilot plot diagram of measurements made at turbine stage four, using the present eccentricity measurement system.

In step 630, the lubrication system containing the lift oil for the turbine bearings is activated, and a driver, such as a turning gear, is engaged to rotate the rotor 30 at slow speed (e.g., less than 20 RPM). In step 640, as the rotor 30 rotates, the laser modules 100 are conveyed on the airfoils 42A, 342A in a path around the rotor 30 and, in transit, make a series of measurements of distance between their instantaneous position and the turbine shell 36 (or inner turbine shell, in the case of a dual-wall turbine shell). The measurement data is transmitted wirelessly from the laser modules 100, via the wireless network 425, to the base station 400. In step 650, the base station 400 transmits the data to a server 430, which generates a plot of the data and performs calculations to produce a circle that is best fit to the data (as shown in FIGS. 18 and 19). The resulting data compilation is pushed to a remote computing device 500, such as a tablet computer, where the data is reviewed by a technician on an app designed for such purpose.

In step 670, the technician determines whether the measured data indicates that the eccentricity of the turbine shell 36 relative to the rotor 30 is within specification. If the eccentricity of the turbine shell 36 and the rotor 30 is within specification, the inspection is complete, and the system is removed (step 680). However, if the eccentricity of the turbine shell 36 and the rotor 30 is not within specification, the position of the turbine shell 36 is adjusted (step 690), and a subsequent scan is performed, beginning by restarting the rotation of the rotor 30 (step 630). The adjustment and scanning process may be repeated until the eccentricity is within specification.

FIGS. 18 and 19 illustrate exemplary pilot plot displays of data 700, 800, respectively, as conveyed from the laser modules 100 to the remote server 430 (shown in FIG. 16), which performs calculations on the data and transmits the results to the app installed on the remote computing device 500. FIG. 18 provides an exemplary plot display of data 700 collected from the early-stage laser module 100, while FIG. 19 provides an exemplary plot display of data 800 collected from the last-stage (e.g., stage-four) laser module 100. The respective stage (items 702, 802) is noted in the lower left corner of the display for reference, although this information may be provided elsewhere.

The pilot plot display 700 includes a segmented circular grid 710 having a center 712 that represents the centerline of the rotor 30. The data collected by the laser module 100 attached to the early-stage bracket 200 is plotted as a plot line 720, and the server 430 fits a circle 730 to the plot line 720 using any method of iterative optimization to find the minimum of the orthogonal distance regression. In an exemplary practice, the Nedler-Mead (Simplex) optimization is used, since it does not require the calculation of any derivatives or the solving of any matrices.

In this instance, which represents data taken at the first turbine stage, the plot line 720 has a scalloped profile, which is reflective of the presence of turbine shrouds around the inner profile of the turbine shell 36. The generated circle 730 has a calculated center 732, which represents an axial centerline of the turbine shell 36 at the first stage. The distance between the calculated center 732 and the rotor center 712 is reported in inches along the X and Y axes of the grid 710 in the lower left corner of the display 700 (as item 704).

Similarly, the pilot plot display 800 includes a segmented circular grid 810 having a center 812 that represents the centerline of the rotor 30. The data collected by the laser module 100 attached to the last-stage bracket 300 is plotted as a plot line 820, and the server 430 fits a circle 830 to the plot line 820, as described above. The generated circle 830 has a calculated center 832, which represents an axial centerline of the turbine shell 36 at the last stage. The distance between the calculated center 832 and the rotor center 812 is reported in inches along the X and Y axes of the grid 820 in the lower left corner of the display 800 (as item 804).

In many circumstances, the target center of the turbine shell 36 at the early stage is not coincident with the rotor center 712. Rather, a defined amount of offset is employed to accommodate changes in position of the rotor 30 and the geometry of the turbine shell 36, as are expected to occur during operation of the gas turbine system 10 (as the turbine 28 becomes heated). The present system allows the technician to determine the actual center of the turbine shell 36 and provides direction to adjust the calculated center of the turbine shell 36 to a predetermined target center (not shown), which may be offset from the rotor center 712.

Further, comparing the calculated center 732 of the turbine shell 36 at the early stage with the calculated center 832 of the turbine shell 36 at the last stage allows the technician to determine if the rotor 30 is angled (either upward or downward) as the rotor 30 extends through the turbine 28. If necessary, adjustments may be made to the position of the turbine shell 36 to achieve the desired eccentricity and degree of inclination (if any).

It is to be understood that the early-stage and last-stage measurements may be taken simultaneously or sequentially. Alternately, in some instances, the measurement of the eccentricity of the turbine shell 36 relative to the rotor 30 may be taken only at the first stage or the second stage.

Figure 20:
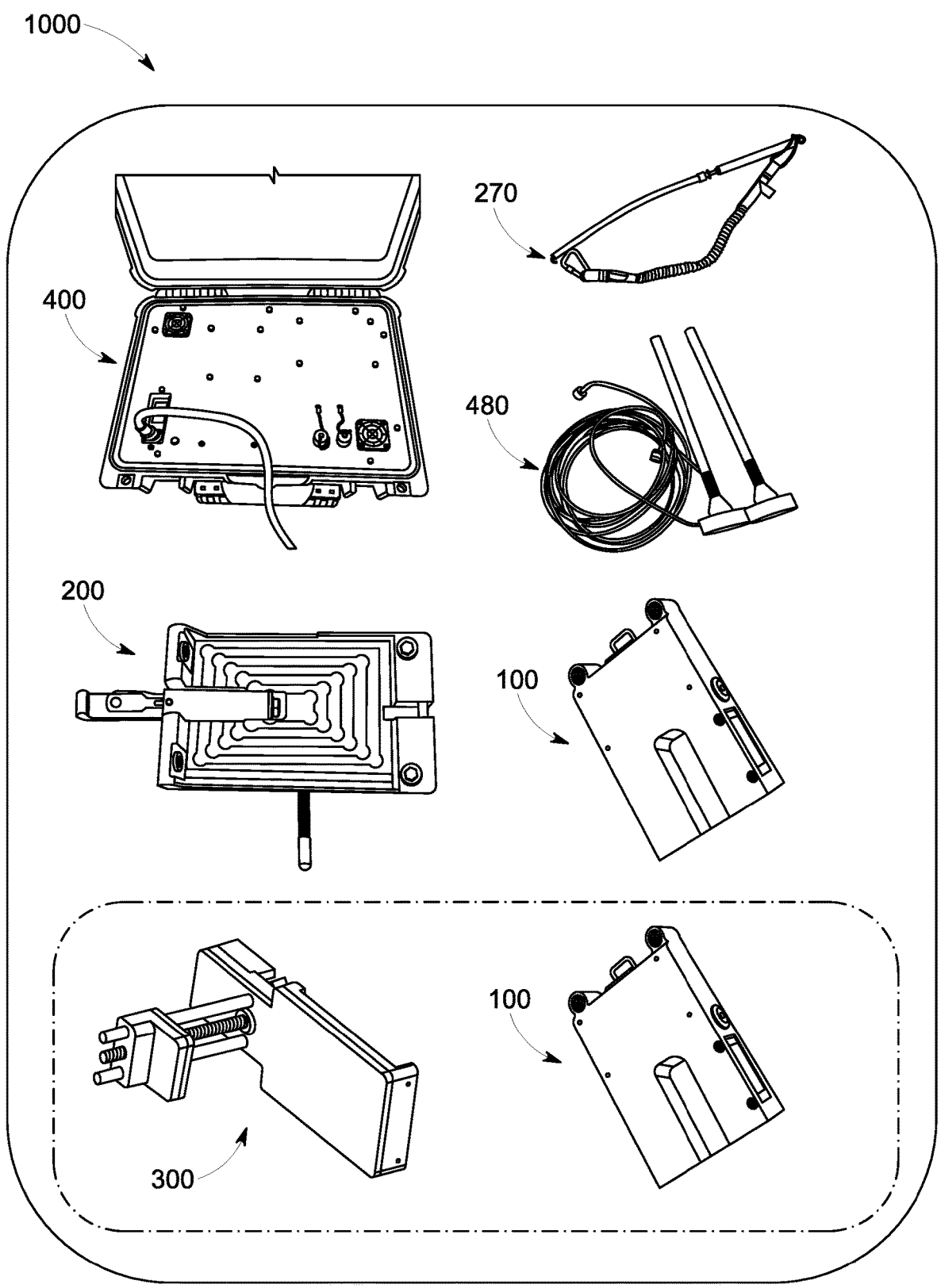
FIG. 20 illustrates components of the eccentricity measurement system of the present disclosure, including a first laser module of FIG. 3, the early-stage bracket of FIG. 6, the base station of FIG. 13, and at least one antenna of FIG. 14, and, optionally, the installation tool of FIG. 9, the last-stage bracket of FIG. 10, and a second laser module of FIG. 3.

FIG. 20 illustrates the present eccentricity measurement system 1000. The system 1000 includes at least one laser module 100, an early-stage bracket 200, a base station 400, and at least one antenna 480 for measuring the eccentricity of the turbine shell 36 relative to the rotor 30 at the first or second turbine stage. The system 1000 may further include a second laser module 100 and a last-stage bracket 300 for measuring the eccentricity of the turbine shell 36 relative to the rotor 30 at the last turbine stage and, thereby, determining the inclination of the rotor 30 from the early turbine stage to the last turbine stage.

The terminology used herein is to describe particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described step or event may or may not occur and that the description includes instances where the step or event occurs and instances where it does not.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described to best explain the principles of the present eccentricity measurement system and method and their practical application and to enable others of ordinary skill in the art to understand the disclosure of various embodiments with various modifications as are suited to the particular use contemplated.

What is claimed is:

1. A system for determining eccentricity of a turbine shell relative to a turbine rotor of a gas turbine, the system comprising:

a first laser module comprising a housing and contained within the housing a microprocessor having coupled thereto a wireless network chip, a laser sensor, an inclination sensor, and a power supply, wherein the laser sensor is configured to transmit a laser beam toward the turbine shell as the turbine rotor spins at a slow speed and to receive a reflected laser beam from the turbine shell, thereby defining a path length indicative of a distance between the laser module and the turbine shell for each of a first series of points disposed circumferentially around the turbine shell;

an early-stage mounting bracket configured to hold the laser module proximate to an early-stage turbine blade connected to the turbine rotor, the early-stage turbine blade being disposed in a first turbine stage or a second turbine stage;

a base station configured to produce a wireless local area network near the turbine shell and to receive a plurality of distance measurement data each corresponding to the distance between the laser module and the turbine shell measured by the laser module for each of the first series of points; and a server for processing the distance measurements into an eccentricity plot of the first turbine stage or the second turbine stage, wherein the eccentricity plot comprises: the plurality of distance data measured by the laser module plotted as a plot line, a circle fitted to the plot line, a circular grid having a center that represents a centerline of the turbine rotor, and a calculated center for the circle that is calculated based on the plurality of distance data measured by the laser module, wherein the calculated center represents a centerline of the turbine shell.

2. The system of claim 1, wherein the housing of the first laser module has a thickness less than a gap distance between the early-stage turbine blade and a circumferentially adjacent early-stage turbine blade.

3. The system of claim 1, wherein the inclination sensor comprises an accelerometer.

4. The system of claim 1, further comprising a remote computing device in wireless communication with the server, the remote computing device comprising an app for receiving and displaying the eccentricity plot.

5. The system of claim 1, wherein the early-stage mounting bracket further comprises a pivoting arm extending from an upstream surface opposite the attachment surface, a hook attached to a distal end of the pivoting arm, and a bracing element removably installed on the mounting bracket; wherein the hook is configured to attach to a trailing edge of the early-stage turbine blade, and the bracing element is configured to contact a leading edge of the early-stage turbine blade or a circumferentially adjacent early-stage turbine blade.

6. The system of claim 1, further comprising a second laser module identical to the first laser module; and a last-stage mounting bracket configured to hold the second laser module proximate to a last-stage turbine blade connected to the turbine rotor.

7. The system of claim 6, wherein the second laser module comprising a second housing, and the last-stage mounting bracket comprises a second recessed attachment surface of a size and a shape complementary to that of the second housing of the second laser module, and a rectangular section sharing a longitudinal axis with the second recessed attachment surface; a bracing element distal to the rectangular section; a pair of guide rods and a threaded rod extending between the rectangular section and the bracing element; and a handle connected to the threaded rod for adjusting a position of the bracing element against the last-stage turbine blade.

8. The system of claim 1, further comprising at least one antenna coupled to the base station, the at least one antenna being installed within the turbine shell or within an annulus between a combustor and the turbine shell or both.

9. The system of claim 1, wherein the early-stage mounting bracket further comprises a first end wall and an opposite second end wall each extending radially outward from the attachment surface, the first and the second end walls bounding the recessed attachment within which the first laser module fits.

10. The system of claim 9, wherein the early-stage mounting bracket further includes a first bracing element removably installed on the mounting bracket, and wherein the second end wall of the mounting bracket is curved to form a second bracing element positioned against a leading edge of the early-stage turbine blade or a circumferentially adjacent early-stage turbine blade.

11. The system of claim 7, further comprising a spacer tool secured to the rectangular section of the late-stage mounting bracket.

12. A method for determining eccentricity of a turbine shell relative to a turbine rotor of a gas turbine, the method comprising:

(a) installing a first mounting bracket to an early-stage turbine blade connected to the turbine rotor and installing a first laser module to the first mounting bracket, wherein the first mounting bracket comprises a recessed attachment surface within which the first laser module fits, the recessed attachment surface having a size and a shape complementary to that of a housing of the first laser module;

(b) establishing, via a base station having a wireless chip, a wireless local area network proximate to the turbine shell;

(c) spinning the turbine rotor at a slow speed to cause rotation of the turbine blade;

(d) taking a first series of measurements of respective distances between the first laser module and the turbine shell by repeatedly directing a laser beam from a laser sensor of the first laser module toward the turbine shell as the turbine rotor spins and receiving a reflected laser beam from the turbine shell, thereby defining a path length indicative of a respective distance between the first laser module and the turbine shell for each of a first series of points disposed circumferentially around the turbine shell;

(e) transmitting the respective distance for each of the first series of points to a server, the server performing calculations and generating an eccentricity plot for an early turbine stage, the early turbine stage being a first turbine stage or a second turbine stage wherein the eccentricity plot comprises: the respective distance for each of the first series of points plotted as a plot line, a circle fitted to the plot line, a circular grid having a center that represents a centerline of the turbine rotor, and a calculated center for the circle that is calculated based on the respective distance for each of the first series of points, wherein the calculated center represents a centerline of the turbine shell; and (f) delivering the eccentricity plot for the first turbine stage to a remote computing device for review to determine if the eccentricity is within a predetermined specification.

13. The method of claim 12, further comprising installing at least one antenna within the turbine shell or within an annulus between a combustor and the turbine shell or both, the at least one antenna being connected to the base station.

14. The method of claim 12, further comprising adjusting a position of the turbine shell if the eccentricity of the early stage is outside the predetermined specification.

15. The method of claim 14, further comprising repeating steps (c), (d), (e), and (f) after adjusting the position of the turbine shell.

16. The method of claim 12, further comprising installing a second mounting bracket to a last-stage turbine blade connected to the turbine rotor; and installing a second laser module to the second mounting bracket.

17. The method of claim 16, further comprising taking a second series of measurements of respective distances between the second laser module and the turbine shell by repeatedly directing a laser beam from a laser sensor of the second laser module toward the turbine shell as the turbine rotor spins and receiving a reflected laser beam from the turbine shell, thereby defining a path length indicative of a respective distance between the second laser module and the turbine shell for each of a second series of points disposed circumferentially around the turbine shell.

18. The method of claim 17, further comprising transmitting the respective distance for each of the second series of points to the server, the server performing calculations and generating an eccentricity plot for the last turbine stage; and delivering the eccentricity plot for the last turbine stage to the remote computing device for review to determine if the eccentricity is within a predetermined specification for the last-stage turbine.

19. The method of claim 18, further comprising adjusting the position of the turbine shell if both the eccentricity of the early stage and the eccentricity of the last stage are outside the respective predetermined specifications.

* * * * *